United States Patent Office 3,066,070
Patented Nov. 27, 1962

---

3,066,070
VINYLENE OXYGENATED SULFUR FUNGICIDES
Maynard S. Raasch, Wilmington, Del., assignor to E. I. du Pont de Nemours and Company, Wilmington, Del., a corporation of Delaware
No Drawing. Filed May 29, 1959, Ser. No. 816,690
5 Claims. (Cl. 167—22)

This invention relates to fungicidal compositions and methods.

More particularly, the present invention is directed to fungicidal formulations for seeds, plants and soil employing as essential active ingredients substituted vinylene disulfones and disulfoxides of the formula:

(1) $RSOCH=CHSO_nR'$ wherein R and R' are the same or different alkyl radicals; the indicated oxygen atoms are joined only to the indicated sulfur atoms, which sulfur atoms otherwise are attached only to carbon atoms; $n$ is a positive whole number not greater than 2, that is 1 or 2.

This application is a continuation-in-part of my copending U.S. applications Serial Nos. 539,948, filed October 11, 1955, now abandoned, and 645,655, filed March 13, 1957.

In the preferred compositions and methods of my invention, I employ as an active ingredient a compound of the above formula in which R and R' are alkyl radicals having from 1 to 6 carbon atoms. Also preferred are the novel compounds represented by the above formula wherein R and R' are alkyl groups of at least 3 carbons and up to, say, 12 carbons. The most preferred compounds are trans-1,2-bis(n-propylsulfinyl)ethylene and trans-1-n-propylsulfinyl-2-n-propyl-sulfonylethylene.

The fungicidally active compounds of the above formula can be prepared by a variety of methods.

One method which is quite satisfactory consists in oxidizing a vinylidene disulfide to the desired disulfoxide. In brief, the oxidation can be carried out with oxidizing agents such as, for example, hydrogen peroxide, peracetic acid, chromic acid, sodium hypochlorite, benzoyl peroxide, nitric acid and potassium permanganate. Thus the vinylene disulfide in solution in a solvent such as acetic acid can be heated with aqueous hydrogen peroxide for several hours. By controlling the reaction conditions, for example, the proportions of oxidizing agents and the temperature and time of oxidation, the disulfide can be oxidized to the disulfoxide and to a mixed sulfoxide sulfone. Specific conditions vary with the particular disulfide being oxidized.

The oxidation of the vinylene disulfoxides with hydrogen peroxide is conveniently carried out in an inert solvent, e.g. acetic acid or acetone. The amount of hydrogen peroxide used should be at least that stoichiometrically equivalent to the degree of oxidation desired. The oxidation can be carried out from temperatures ranging from room temperature, i.e. 20–30° C., up to 100° C. The reaction time is not critical, although if the reaction is carried out for extremely short periods, there is a tendency for a mixture of products to be formed. The oxidation with hydrogen peroxide takes place in the absence of a catalyst. However, a catalyst such as ammonium molybdate can be used if desired.

For example, 1,2-bis(methylmercapto)ethylene can be prepared by heating at reflux temperature an alcoholic solution of methyl mercaptan, potassium hydroxide and cis(dichloro) ethylene.

The vinylene disulfides used as starting materials for the above-described process can be made by reacting a halo-substituted ethylene, such as 1,2-dichloroethylene, with a mercaptide, or with a mercaptan in the presence of an alkali metal hydroxide.

The fungicidally active substituted mixed sulfoxide sulfone used in the compositions and methods of this invention can also be prepared from an alkyl chlorovinylsulfone by a method as described by Backer et al., Rec. trav. chim. 72, 813 (1953), by reaction with mercaptans and subsequent oxidation.

It will be understood that the fungicidally active compounds used in my novel compositions and methods can exist either as cis or trans isomers, or as mixtures of such isomers. In general, the trans isomers have been found to possess slightly more activity than the corresponding cis isomers. The cis-trans mixtures also, of course, possess fungicidal activity.

It will be further understood that where no notation appears with a structural formula or with a chemical name, the formula or name is to be interpreted in its generic sense; that is, as representing the individual isomers as well as mixtures thereof.

In practicing the fungicidal methods of my invention, one or more of the active ingredients is applied to the organic material to be treated for the control of fungi at a dosage sufficient to exert fungicidal action. Accordingly, my compositions and methods are applicable for the protection of carbohydrates, proteins and fats. They are particularly suited for the treating of living plants such as vegetables, ornamental plants and fruitbearing trees. The compositions are also highly effective when applied directly to the soil for controlling plant fungi. Also they can be used to treat organic fibers and fabrics and various cellulosic materials such as wood and leather. Likewise they can be used to treat paints and lubricating oils. They also are of value as seed-treating agents.

In the application to plants, fungicidal control is obtained in most instances by applying the active compound at a dosage or rate of from about 0.5 to 10.0 lbs. per acre. The optimum amount within this range is largely dependent upon the variables mentioned above.

For application directly to soil for use as a systemic fungicide, in most instances, the dosage or rate is from about 1 to 75 lbs. per acre. The optimum dosage can be determined in each instance by one of the means conventional in the art. It is, of course, determined by and dependent upon the particular fungicidal compounds selected, the method of application, and, in the case of application to vegetation, the state and condition of the growth of the vegetation to be treated, and the climatic conditions.

For seed treating, one applies the compounds of Formula 1 to seed at some time prior to planting in order to increase the percentage of seeds that will germinate. The rates employed will range from about $1/16$ to $1/8$ oz. of such active seed-treating agent per 100 pounds seed (oz./cwt.) up to about 6 to 8 oz./cwt. Less than this minimum amount of active material produces results which are generally not effective for seed treatment and more than this maximum amount damages seed and tends to exert undesirable phytotoxic effects on germinating plants. It will be clear to one skilled in the art that the rates that should be employed will vary with the type of seed involved. Larger seeds such as corn, sorghum and cotton can be treated with lesser rates—say from $1/16$ to 2 oz. of active ingredient per hundredweight although the treatment will not yet be injurious at somewhat higher dosages. Certain seeds, such as lima beans may be particularly sensitive and no more than ½–1 oz./cwt. should be used for them. Small seeds—such as grasses, alfalfa, tomatoes, cabbage and the like are treated with somewhat higher dosages, and from ⅓ to 8 oz./cwt. can be employed.

The fungicidal compositions of the present invention contain in sufficient amount to exert fungicidal action one or more of the above-described active compounds in admixture with a carrier material or conditioning agent of the kind used and commonly referred to in the art as a fungicide adjuvant or a modifier. The conventional fungicide adjuvants are inert solids, hydrocarbon liquid diluents, and surface-active agents. They provide formulations adapted for ready and efficient application using conventional applicator equipment. Usually from about 1 to 95% by weight of the fungicidal composition is active ingredient.

Solid compositions are preferably in the form of powders. They are compounded to the homogeneous powders that either can be used as such, diluted with inert solids to form dusts, or suspended in a suitable liquid medium for spray application. The powders usually comprise active ingredient admixed with minor amounts of a conditioning agent.

Natural clays, either absorptive such as attapulgite or relatively non-absorptive such as china clays, diatomaceous earth, walnut shell flour, redwood flour, synthetic fine silica, calcium silicate and other inert solid carriers of the kind conventionally employed in powder fungicidal compositions can be used. The active ingredient usually makes up from about 25 to 90% of these powder compositions. For conversion of the powders to dusts, talc, pyrophyllite, tobacco dust, volcanic ash and other dense rapid-settling inert solids customarily are used.

Liquid compositions employing one or more of the fungicidally active ingredients are prepared by admixing the active ingredients with a suitable liquid diluent medium. The active ingredients can be either in solution or in suspension in the liquid medium. Typical of the liquid media commonly employed as fungicidal adjuvants are kerosene, Stoddard solvent, xylene, alcohols, alkylated naphthalenes and glycols. The active ingredient usually makes up from about 0.5 to 50% of these liquid compositions. Some of these compositions are designed to be used as such, and others to be extended with large quantities of water.

Compositions in the form of wettable powders or liquids in many cases also include one or more surface active agents such as wetting, dispersing or emulsifying agents. These materials cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Sanitary Chemicals," August, September and October, 1949.

In order that the invention may be better understood, the following examples are given in addition to those already set forth above:

*Example 1*

To a solution of 24 grams (.2 mol) of 1,2-bis(methylmercapto)ethylene and 75 ml. of acetone is added 47.6 grams (0.42 mole) of 30% $H_2O_2$. Temperature maintained below 40° C. for 26 hours. Then the solvent is evaporated on standing in a current of air at room temperature. 28.8 grams of solid is obtained, M.P. 69.5–80° C. Fractional crystalliaztion from benzene in alcohol yields two products, one 21 grams, M.P. 85.5 to 87.5 and the second 4.1 grams, M.P. 120–131° C. Recrystallization of fraction one from ethyl acetate yields 12 grams of pure cis-1,2-bis(methylsulfonyl)ethylene, M.P. 87–89° C. Analysis: Percent C, aver. 31.79; percent H, aver. 5.34. Recrystallization of fraction two from acetonitrile gives 2.9 grams of pure trans 1,2-bis(methylsulfinyl)ethylene, M.P. 141–145.5° C. Analysis: percent C, aver. 30.83; percent H, aver. 5.21.

*Example 2*

A fungicidal composition containing 25% cis 1,2-bis-(methylsulfinyl)ethylene, M.P. 87–89° C. and 75% ground phosphate rock is prepared by blending the components together and passing the blend through a micropulverizer.

The resulting dust formulation when applied to apple trees at the rate of 10–15 lbs. of active material per acre is effective in preventing apple scap (*Venturia inaequalis*).

*Example 3*

A dust formulation containing 30% trans 1,2-bis(methylsulfinyl)ethylene, M.P. 141–145.5° C., and 70% stearated calcium carbonate is tumbled with cucumber seed at the rate of 2–3 oz. of active material per 100 lbs. of seed. The treated seeds, along with untreated seeds as a control, are planted. After allowing sufficient time for the seeds to germinate, it is found that 2–3 times as many treated seeds germinate as do untreated seeds.

Specific examples of mixturess of cis and trans vinylene disulfoxides in addition to those already mentioned, which fall within the scope of this invention, include:

(4) 1,2-bis(ethylsulfinyl)ethylene
(5) 1,2-bis(isopropylsulfinyl)ethylene
(6) 1,2-bis(n-butylsulfinyl)ethylene
(7) 1,2-bis(isobutylsulfinyl)ethylene
(8) 1,2-bis(t-butylsulfinyl)ethylene
(9) 1,2-bis(amylsulfinyl)ethylene
(10) 1,2-bis(hexylsulfinyl)ethylene
(11) 1,2-bis(heptylsulfinyl)ethylene
(12) 1,2-bis(octylsulfinyl)ethylene
(13) 1,2-bis(nonylsulfinyl)ethylene
(14) 1,2-bis(decylsulfinyl)ethylene
(15) 1,2-bis(dodecylsulfinyl)ethylene These compounds are prepared by the procedure of Example 1 (supra) using 0.2 mole of the 1,2-bis(alkylmercapto)ethylene:

| R | R—S—CH=CH—S—R Weight of alkylmercaptoethylene required in grams for 0.2 mol |
| --- | --- |
| $C_2H_5$ | 29.6 |
| $C_3H_7$ | 35.2 |
| $C_4H_9$ | 40.8 |
| $C_5H_{11}$ | 46.4 |
| $C_6H_{13}$ | 52.0 |
| $C_7H_{15}$ | 57.6 |
| $C_8H_{17}$ | 62.2 |
| $C_9H_{19}$ | 68.8 |
| $C_{10}H_{21}$ | 74.4 |
| $C_{12}H_{25}$ | 95.6 |

All of the foregoing compounds give excellent control of fungi when applied to material to be protected from fungi.

*Example 16*

Cis 1,2-bis-(n-propylsulfinyl)ethylene is formulated into a fungicidal composition having the following ingredients:

25% cis 1,2-bis-(n-propylsulfinyl)ethylene
70% ethylene chloride
5% alkyl aryl polyether alcohol The active compound is dissolved in the solvent then the emulsifier, the alkyl aryl polyether alcohol, is blended into the ethylene chloride solution.

This emulsifiable oil formulation is mixed with water at the rate of 1 gal. per 100 gals. of water. This aqueous mixture is then drilled into soil, which is known to be infested with cotton sore shin (*Rhizoctonia solani*), at the rate of 75 lbs. of active material per acre. After 5 days, cotton seeds are planted, and the plants that develop are not afflicted with sore shin.

Example 17

The fungicidal composition of this example contains the following:

20% trans 1,2-bis-(n-propylsulfinyl)ethylene, $N_D^{25}$ 1.5255 (undistilled oil)
0.25% sodium lauryl sulfate
0.50% sodium lignin sulfonate
79.25% kaolin clay The above components are blended together and passed twice through a micropulverizer.

The resulting wettable powder when diluted with water and applied to tomato plants at the rate of 2-3 lbs. of active material per 100 gallons per acre is effective in preventing tomato late blight (*Phytophthora infestans*).

Specific examples of mixtures of cis and trans mixed sulfoxide-sulfones of this invention are as follows:

(18) 1-methylsulfinyl-2-n-propylsulfonyl ethylene
(19) 1-ethylsulfinyl-2-n-propylsulfonyl ethylene
(20) 1-propylsulfinyl-2-n-propylsulfonyl ethylene
(21) 1-isopropylsulfinyl-2-isopropylsulfonyl ethylene
(22) 1-ethylsulfinyl-2-t-butylsulfonyl ethylene
(23) 1-methylsulfonyl-2-n-propylsulfinyl ethylene
(24) 1-ethylsulfonyl-2-n-propylsulfinyl ethylene
(25) 1-dodecylsulfonyl-2-n-propylsulfinyl ethylene These compounds are conveniently prepared from 2-chloro-1-alkyl sulfonyl ethylenes. This intermediate can be prepared as described by H. J. Backer et al., Rec. trav. chim. 72, 813-24 (1953), No. 1/10 September/October. Backer describes the reaction of his intermediates with mercaptans. Oxidation by a similar procedure as in Example 1 with one mole equivalent of 30% $H_2O_2$ yields the mixed sulfone-sulfoxide. This reaction may be described by the following equations:

(1) $R-SO_2-CH=CHCl + HSR_1 \rightarrow R-SO_2-CH=CHSR_1$
(2) $R-SO_2-CH=CH-SR_1 + H_2O_2 \rightarrow R-SO_2CH=CHSOR_1$ All of the foregoing compounds give excellent control of fungi when applied to material to be protected from fungi.

The claims are:

1. A compound of the formula $$RSOCH=CHSO_nR'$$

where R and R' are alkyl radicals of 1 through 12 carbon atoms, n is a positive whole number not greater than 2, and the indicated oxygen atoms are joined only to the indicated sulfur atoms, which sulfur atoms otherwise are attached only to carbon atoms.

2. A method of controlling fungi comprising applying to the material to be protected at least a fungicidally effective amount of a compound having the formula $$RSOCH=CHSO_nR'$$

where R and R' are alkyl radicals of 1 through 12 carbon atoms, n is a positive whole number not greater than 2, and the indicated oxygen atoms are joined only to the indicated sulfur atoms, which sulfur atoms otherwise are attached only to carbon atoms.

3. A fungicidal composition containing a surface active agent and at least one compound having the formula $$RSOCH=CHSO_nR'$$

where R and R' are alkyl radicals of 1 through 12 carbon atoms, n is a positive whole number not greater than 2, and the indicated oxygen atoms are joined only to the indicated sulfur atoms, which sulfur atoms otherwise are attached only to carbon atoms.

4. A fungicidal composition comprising an inert powder diluent and at least one compound having the formula $$RSOCH=CHSO_nR'$$

where R and R' are alkyl radicals of 1 through 12 carbon atoms, n is a positive whole number not greater than 2, and the indicated oxygen atoms are joined only to the indicated sulfur atoms, which sulfur atoms otherwise are attached only to carbon atoms.

5. A fungicidal composition containing hydrocarbon liquid diluent and at least one compound having the formula $$RSOCH=CHSO_nR'$$

where R and R' are alkyl radicals of 1 through 12 carbon atoms, n is a positive whole number not greater than 2, and the indicated oxygen atoms are joined only to the indicated sulfur atoms, which sulfur atoms otherwise are attached only to carbon atoms.

References Cited in the file of this patent

UNITED STATES PATENTS 2,641,594    Barney _____ June 9, 1953
2,893,911    Raasch _____ July 7, 1959

OTHER REFERENCES

Chem. Abs. 18, 1113 (1924).
Frear: A Catalogue of Insecticides and Fungicides—vol. I (1947), page 58.